June 1, 1926.  1,587,427
W. SCHWIER
TOWLINE
Filed July 6, 1925   2 Sheets-Sheet 1

Inventor
William Schwier
By
Attorney

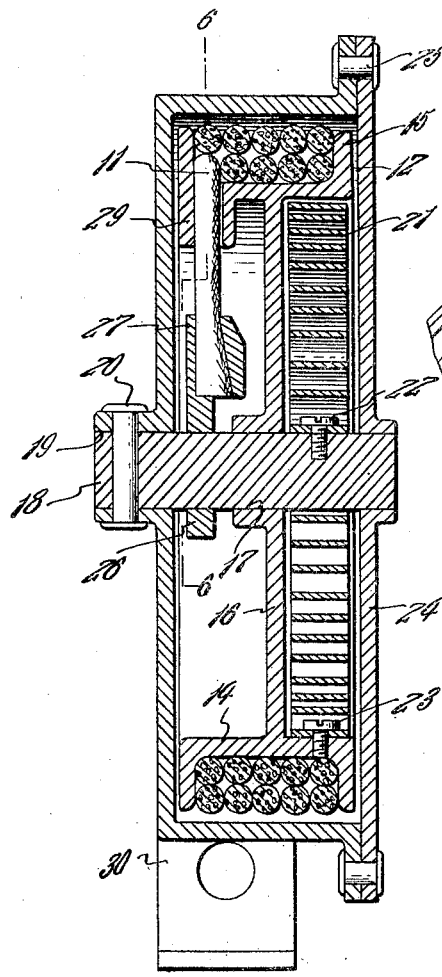
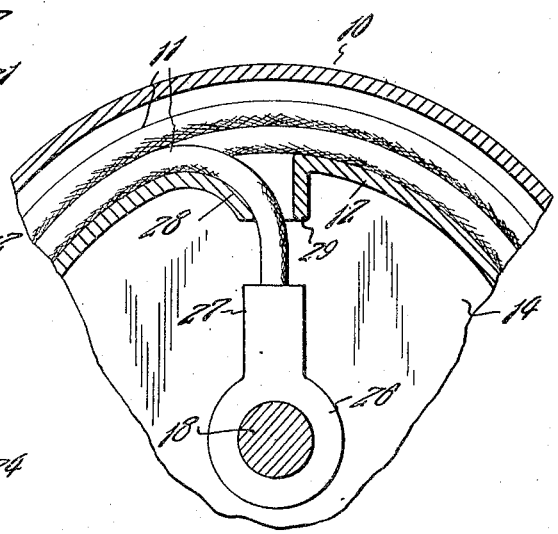
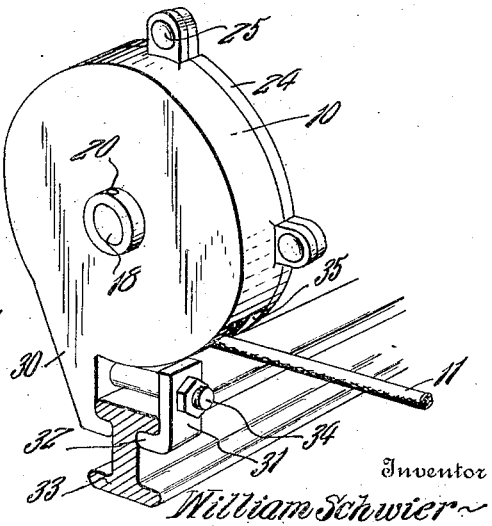

Patented June 1, 1926.

1,587,427

UNITED STATES PATENT OFFICE.

WILLIAM SCHWIER, OF LOS ANGELES, CALIFORNIA, ASSIGNOR OF ONE-HALF TO LEE B. COATS, OF LOS ANGELES, CALIFORNIA.

TOWLINE.

Application filed July 6, 1925. Serial No. 41,647.

The object of the invention is to provide a device adapted to be carried as a permanent or fixed attachment to an automobile or other vehicle as an emergency equipment so that, in the event of the machine carrying the same being disabled, ready means may be provided for connection to a towing machine; to provide a spring-actuated drum for carrying the towing cable or rope in order that any slack may be readily taken up to prevent entangling of the cable or rope or its dragging on the ground; to provide means for attaching the inner or fixed end of the cable or tow line so that it may be kept free of sharp bends likely to rupture the strands; and to provide a construction consisting of a minimum of parts of simple design in order that manufacturing cost may be low and the devices marketed at a minimum price.

With this object in view, the invention consists in a construction and combination of parts of which a preferred embodiment is illustrated in the accompanying drawings, wherein:

Figure 3 is a central vertical sectional view of the structure of Figure 2.

Figure 5 is a detail perspective view showing a portion of a vehicle axle with the invention mounted in position thereon, this view illustrating the method of clamping the device to the axle.

Figure 6 is a detail sectional view on the plane indicated by the line 6—6 of Figure 3.

Figure 1:
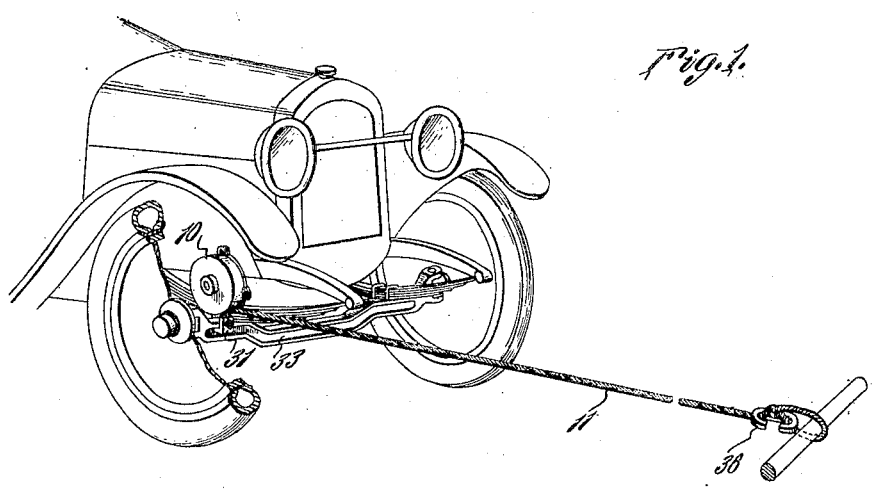
Figure 1 is a perspective view illustrating one end of an auto vehicle, showing the method of attaching the invention.
Figure 2:
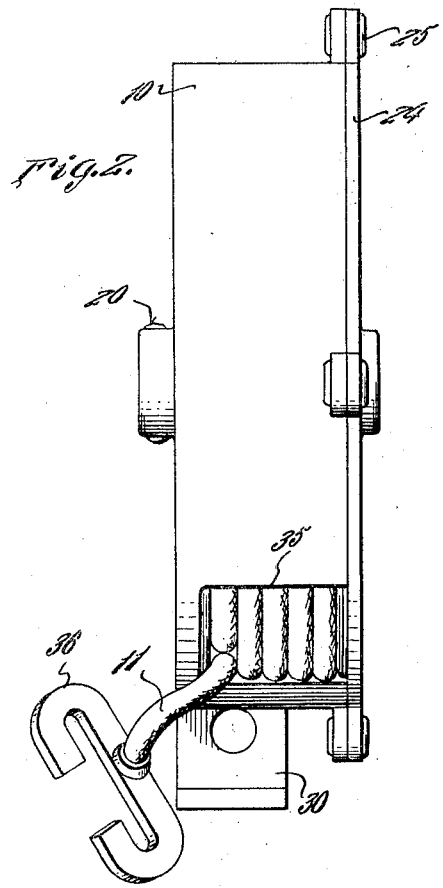
Figure 2 is a front elevational view of the invention detached.
Figure 4:
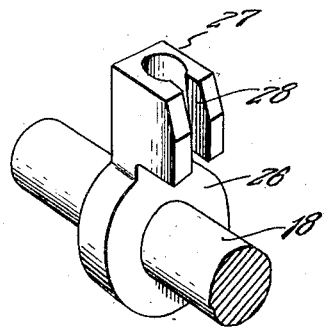
Figure 4 is a detail perspective view illustrating the means for securing the inner end of the tow line or cable in the device.

Enclosed within a housing 10, the tow line or cable 11 is carried by a drum 12 on the rim 14 of the latter which is flanged at opposite edges, as at 15, to provide a seat for the reeled cable. The web 16 which carries the rim is centrally positioned of the latter and at the center is formed with an eye bounded by a flange 17 constituting a bearing to permit the free rotation of the drum on the fixed shaft 18, the latter being mounted centrally of the casing and extending transversely thereof and being secured in a flanged opening 19 in the casing by means of a fastener 20 which may be a rivet or screw, this fastener passing transversely through the flange bounding the opening and passing also through the shaft 18.

The actuating spring 21 is made preferably of steel ribbon wound in a spiral as indicated, with one end anchored to the shaft 18 as by a screw 22 and the other end anchored to the rim on the inner periphery of the latter as by a screw 23. The space bounded by the rim on one side and by the web constitutes, together with the cover plate 24 of the housing, a compartment or chamber for the spring. The cover plate is secured to the casing by fastening means such as those indicated at 25.

The spring is so disposed that it tends to rotate the drum in a direction to reel the cable 11 thereon, the cable being unreeled against the torsion of the spring and, when fully extended, the construction provides for the transfer of the pull direct to the shaft 18, the inner end of the cable being secured to the shaft by means of a connector of which the eye 26 surrounds and loosely engages the shaft and the socket 27 with which the cable connects is provided with a conical bore having a larger diameter at the inner end so that the strands of the cable may be flared, as indicated, when effecting a connection. The socket portion 27 is split, as indicated at 28, to permit compression of the socket diametrically to effect firm engagement with the connected end of the cable.

In passing from the connector to the rim of the drum, the cable passes through a guideway 29 in the rim, this guideway being disposed at an angle with the radius at this point to assume a substantially tangential position so as to provide for a gradual and therefore preclude a sharp bend in the cable at the point where it begins to encircle the rim of the drum. The space within the casing on that side of the web opposite the spring provides for conveniently housing the cable connector to permit the free rotation of it and its socket portion as the drum is rotated in the unreeling operation.

The arrangement of the drum in the form shown; namely, a drum of relatively large diameter, provides for carrying a relatively great length of cable in a comparatively small space, thus providing for an actuating spring with a minimum of convolutions or coils, since but comparatively few revolutions of the drum are necessary to completely unreel the cable.

The means for mounting the device consists of a clamp comprising complemental members 30 and 31 of which the former is formed integrally with the casing 10 on the periphery of the same. The other clamp member is a separate element but both are provided with inturned flanges 32 adapted to engage under the flange of the vehicle axle 33 when the bolt 34 which connects them and rests upon the upper face or the under face of the axle, depending on the method of attachment, brings the members into clamping engagement with the axle.

The casing 10 is provided with a peripheral opening 35 disposed adjacent the clamp, the cable in the reeling or unreeling operation passing through this opening and its position disposing the point of application of pull adjacent the vehicle axle.

The free extremity of the cable is provided with a grapple 36 to facilitate connection with the towing device.

The invention having been described, what is claimed as new and useful is:

1. A towing device comprising a spring-actuated drum, a towing cable reeled thereon, and a connector anchoring the cable at the axis of the drum and independent thereof but rotating with the drum, the connector having a socket for the reception of the extremity of the cable and said socket having a bore of conical shape with the larger diameter at the inner end.

2. A towing device comprising a spring-actuated drum, a towing cable reeled thereon, and a connector anchoring the cable at the axis of the drum and independent thereof but rotating with the drum, the connector having a socket for the reception of the extremity of the cable and said socket having a bore of conical shape with the larger diameter at the inner end, and being split axially for diametrical compression for securement of the end of the cable.

3. A towing device comprising a casing and a cover plate therefor, a shaft transversely spanning the casing and supported by the same and the cover plate, a drum enclosed within the casing and rotatably mounted on the shaft, the drum comprising a rim and a centrally positioned web, an actuating spring terminally secured to the shaft and the inner periphery of the rim and disposed within the casing on one side of the web, a cable reeled upon the drum, and a connector rotatably mounted on the shaft on the opposite side of the web from the spring and having the inner end of the cable secured to it.

4. A towing device comprising a casing and a cover plate therefor, a shaft transversely spanning the casing and supported by the same and the cover plate, a drum enclosed within the casing and rotatably mounted on the shaft, the drum comprising a rim and a centrally positioned web, an actuating spring terminally secured to the shaft and the inner periphery of the rim and disposed within the casing on one side of the web, a cable reeled upon the drum, and a connector rotatably mounted on the shaft on the opposite side of the web from the spring and having the inner end of the cable secured to it, the rim being provided with a guide disposed at an acute angle to the radius of the drum and approximating a tangential position, the cable passing from the connector through said guide.

5. A towing device comprising a circular casing open at one side, a cover plate closing the open side, a centrally disposed shaft spanning the casing and secured in the side wall thereof and entering an opening in the cover plate, a drum rotatably mounted upon the shaft and enclosed by the casing and comprising a rim and a centrally disposed web, an actuating spring having its ends secured respectively to the shaft and the inner periphery of the rim, the spring being disposed on one side of the web and bounded by the rim and enclosed by the cover plate, a cable reeled upon the rim, and a connector rotatably mounted on the shaft and enclosed by the casing and disposed on the opposite side of the web from the spring, the inner end of the cable passing through a substantially tangentially disposed guideway and being secured to the connector.

In testimony whereof he affixes his signature.

WILLIAM SCHWIER.